US008516443B2

(12) United States Patent
Li et al.

(10) Patent No.: US 8,516,443 B2
(45) Date of Patent: Aug. 20, 2013

(54) CONTEXT-SENSITIVE ANALYSIS FRAMEWORK USING VALUE FLOWS

(75) Inventors: Lian Li, Carindale (AU); Cristina N. Cifuentes, Brisbane (AU); Nathan Robert Albert Keynes, Kuraby (AU)

(73) Assignee: Oracle International Corporation, Redwood Shores, CA (US)

( * ) Notice: Subject to any disclaimer, the term of this patent is extended or adjusted under 35 U.S.C. 154(b) by 78 days.

(21) Appl. No.: 13/117,078

(22) Filed: May 26, 2011

(65) Prior Publication Data

US 2012/0304153 A1 Nov. 29, 2012

(51) Int. Cl.
  *G06F 9/44* (2006.01)
(52) U.S. Cl.
  USPC ........... 717/123; 717/124; 717/126; 717/127; 717/131; 717/132; 717/133
(58) Field of Classification Search
  None
  See application file for complete search history.

(56) References Cited

U.S. PATENT DOCUMENTS

| | | | | |
|---|---|---|---|---|
| 7,089,537 | B2 * | 8/2006 | Das et al. | 717/132 |
| 7,669,193 | B1 * | 2/2010 | Chipman | 717/152 |
| 7,900,193 | B1 * | 3/2011 | Kolawa et al. | 717/126 |
| 7,945,898 | B1 * | 5/2011 | Episkopos et al. | 717/124 |
| 2010/0083240 | A1 * | 4/2010 | Siman | 717/144 |
| 2010/0257516 | A1 * | 10/2010 | Roediger et al. | 717/155 |
| 2012/0167060 | A1 * | 6/2012 | Landwehr et al. | 717/132 |

OTHER PUBLICATIONS

Amellal, S.; Kaminska, B.; , "Scheduling of a control data flow graph," Circuits and Systems, 1993., ISCAS '93, 1993 IEEE International Symposium on , vol., no., pp. 1666-1669 vol. 3, May 3-6, 1993.*
Andersen, L. O., "Program Analysis and Specialization for the C Programming Language," Ph.D. Thesis, University of Copenhagen, DIKU, May 1994, 43 pages.
Whaley, J. and Lam, M. S., "Cloning-Based Context-Sensitive Pointer Alias Analysis Using Binary Decision Diagrams," Conference on Programming Language Design and Implementation (PLDI), Jun. 2004, 14 pages.
Lhotak, O. and Hendren, L., "Context-Sensitive Points-To Analysis: Is It Worth It?" ACM Transactions on Software Engineering and Methodology (TOSEM), vol. 18, Issue No. 1, Sep. 2008, 16 pages.
Milanova, A. et al., "Parameterized Object Sensitivity for Points-To Analysis for Java," ACM Transactions on Software Engineering and Methodology (TOSEM), vol. 14, Issue No. 1, Jan. 2005, 41 pages.

(Continued)

*Primary Examiner* — Isaac Tecklu
*Assistant Examiner* — Adam Conkey
(74) *Attorney, Agent, or Firm* — Osha Liang LLP

(57) ABSTRACT

In general, in one aspect, the invention relates to a method for identifying program properties in source code. The method includes: identifying a set of program objects corresponding to a potential program property within the source code; identifying a function associated with the set of program objects in the source code; identifying an input and an output of the function in the source code; creating a value flow graph by: creating a function input node representing the input; creating a function output node representing the output; identifying value flow functions, where each value flow function defines a conditional dependency between a pair of graph nodes, and creating, based on the value flow functions, directed graph edges modeling a potential flow of data through the value flow graph; and identifying a feasible path in the value flow graph depicting an occurrence of the potential program property in the source code.

15 Claims, 10 Drawing Sheets

(56) References Cited

OTHER PUBLICATIONS

Nystrom, E. M. et al., "Bottom-Up and Top-Down Context-Sensitive Summary-Based Pointer Analysis," Static Analysis Symposium (SAS), Aug. 2004, 17 pages.

Fahndrich, M. et al., "Scalable Context-Sensitive Flow Analysis Using Instantiation Constraints," Conference on Programming Language Design and Implementation (PLDI), Jun. 2000, 11 pages.

Bodik, R., "Path-Sensitive, Value-Flow Optimizations of Programs," Ph.D. Thesis, University of Pittsburgh, Nov. 1999, 175 pages.

Sathyanathan, P. W. and Lam, M. S., "Context-Sensitive Interprocedural Analysis in the Presence of Dynamic Aliasing," Languages and Compilers for Parallel Computing (LCPC), Aug. 1996, 19 pages.

Jung, Y. and Yi, K, "A Practical Memory Leak Detector Based on Parameterized Procedural Summaries," In Proceedings of the 7th International Symposium on Memory Management (ISMM), Jun. 2008, 10 pages.

Liang, D. and Harrold, M. J., "Efficient Points-To Analysis for Whole-Program Analysis," In Proceedings of the ESEC/FSE-7, Sep. 1999, 17 pages.

Zhu, J. and Calman, S., "Symbolic Pointer Analysis Revisited," In Proceedings of the ACM SIGPLAN 2004 Conference on Programming Language Design and Implementation (PLDI), Jun. 2004, 13 pages.

Chatterjee, R. et al., "Relevant Context Inference," In Proceedings of the 26th ACM SIGPLAN-SIGACT Symposium on Principles of Programming Languages (POPL), Jan. 1999, 15 pages.

\* cited by examiner

CONTEXT-SENSITIVE ANALYSIS FRAMEWORK USING VALUE FLOWS

BACKGROUND

Software quality and reliability improvements have been made at many facets of the software development lifecycle. Analysis of the impact of software defects has shown potentially astronomical costs associated with many such defects. Examples of software defects include memory leaks, deadlocks, and other hazardous program states. In some cases, static analysis tools can help to improve software quality, perform impact analysis, detect vulnerabilities, detect inefficiencies, and prevent potentially costly defects.

Static analysis tools can be used at any stage of the software development lifecycle, and may involve the analysis of software code for one or more known potential defects. This analysis may be performed at the initial design stage of a new software product or may be used to maintain and/or upgrade existing applications. In either stage, software static analysis tools have proven useful in the design and implementation of many software systems.

Static analysis tools may utilize context-sensitive or context-insensitive analysis. Context-sensitive analysis distinguishes different calling contexts at different call sites. Accordingly, context-sensitive analyses can be much more precise than context-insensitive analyses. However, context-sensitive analyses are often exponential and expensive. All functions need to be analyzed in complete detail, which may result in unnecessary computations. Precisely modeling all side effects of a function can be very complex. For example, it is sometimes infeasible to model all potential side effects at the presence of recursion. As a result, traditional context sensitive analysis may be difficult to implement efficiently.

SUMMARY

In general, in one aspect, the invention relates to a method for identifying program properties in source code. The method includes: identifying, using a processor, a set of program objects corresponding to a potential program property within the source code; identifying, using the processor, a function associated with the set of program objects in the source code; identifying an input and an output of the function in the source code; creating a value flow graph including a set of graph nodes by: creating a function input node of the set of graph nodes representing the input; creating a function output node of the set of graph nodes representing the output; creating a set of object nodes of the set of graph nodes representing the set of program objects, identifying value flow functions, where each value flow function defines a conditional dependency between a pair of graph nodes of the set of graph nodes, and creating, based on the value flow functions, a set of directed graph edges of the value flow graph modeling a potential flow of data among the set of graph nodes; and identifying, using the processor and based on a feasible subset of the set of directed graph edges, a feasible path in the value flow graph depicting an occurrence of the potential program property in the source code.

In general, in one aspect, the invention relates to a computer-readable storage medium storing instructions for identifying program properties in source code. The instructions include functionality to: identify a set of program objects corresponding to a potential program property within the source code; identify a function associated with the set of program objects in the source code; identify an input and an output of the function in the source code; create a value flow graph including a set of graph nodes by: creating a function input node of the set of graph nodes representing the input; creating a function output node of the set of graph nodes representing the output; creating a set of object nodes of the set of graph nodes representing the set of program objects, identifying value flow functions, where each value flow function of the value flow functions defines a conditional dependency between a pair of graph nodes of the set of graph nodes, and creating, based on the value flow functions, a set of directed graph edges of the value flow graph modeling a potential flow of data among the set of graph nodes; and identify, based on a feasible subset of the set of directed graph edges, a feasible path in the value flow graph depicting an occurrence of the potential program property in the source code.

In general, in one aspect, the invention relates to a system for identifying program properties in source code. The system includes: a processor; a program property repository including functionality to store a potential program property definition; and a static analysis tool executing on the processor and including functionality to: identify, based on the potential program property definition, a set of program objects corresponding to a potential program property within the source code; identify, in the source code, a function associated with the set of program objects; identify an input and an output of the function in the source code; create a value flow graph including a set of graph nodes by: creating a function input node of the set of graph nodes representing the input, creating a function output node of the set of graph nodes representing the output, creating a set of object nodes of the set of graph nodes representing the set of program objects, identifying value flow functions, where each value flow function of the value flow functions defines a conditional dependency between a pair of graph nodes of the set of graph nodes, and creating, based on the value flow functions, a set of directed graph edges of the value flow graph modeling a potential flow of data among the set of graph nodes; and identify, based on a feasible subset of the set of directed graph edges, a feasible path in the value flow graph depicting an occurrence of the potential program property in the source code.

Other aspects of the invention will be apparent from the following description and the appended claims.

DETAILED DESCRIPTION

Figure 1:
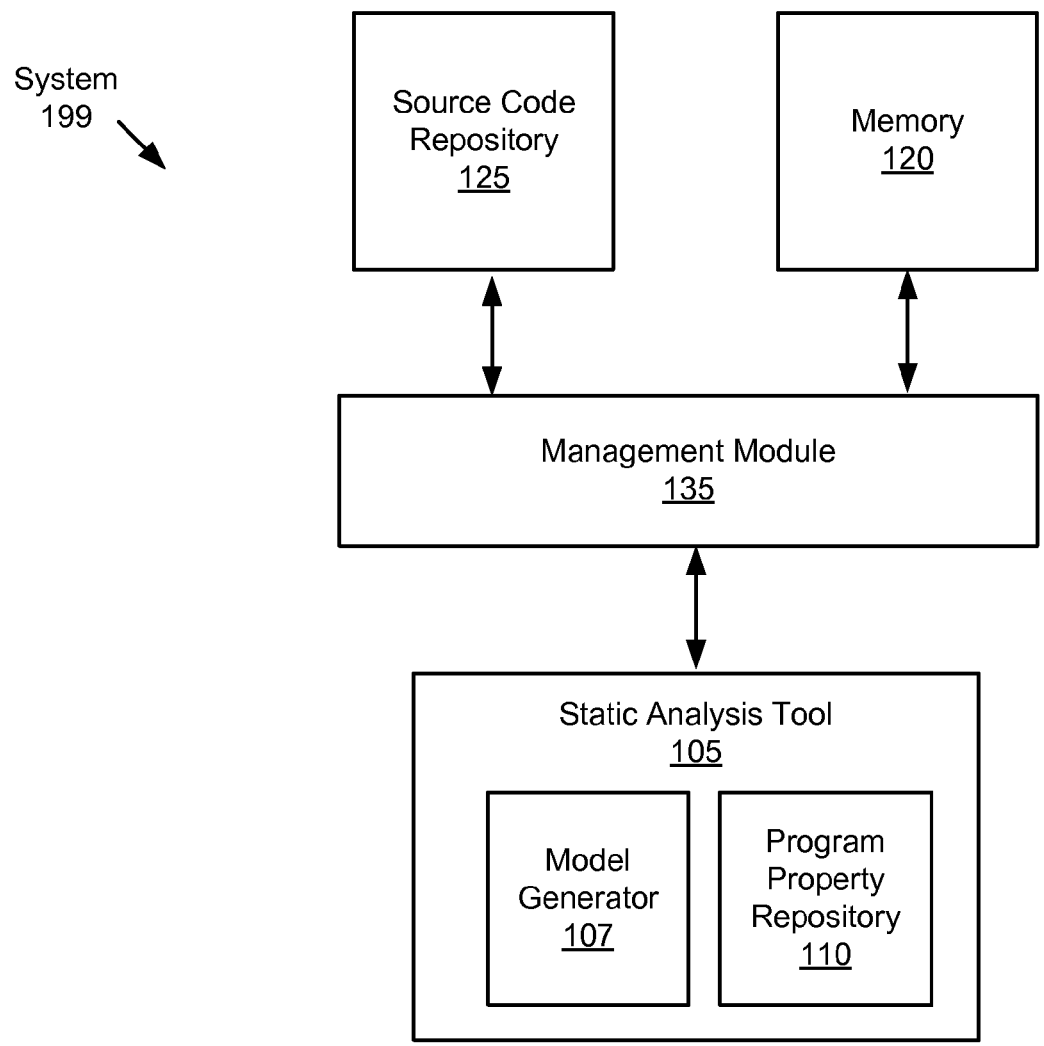
FIG. 1 shows a schematic diagram in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for detecting program properties based on source code. Specifically, embodiments of the invention identify one or more program objects and one or more functions corresponding to a potential program property. A value flow graph modeling the program objects and/or functions is generated. The value flow graph may include a function input node representing an input of the function and a function output node representing an output of the function. Context sensitive analysis is then used to identify one or more feasible graph edges connecting the graph nodes. A feasible path through the value flow graph depicting an occurrence of the potential program property may then be identified.

FIG. 1 shows a system (199) in accordance with one embodiment of the invention. As shown in FIG. 1, the system has multiple components including a static analysis tool (105), a model generator (107), a program property repository (110), a memory (120), a source code repository (125), and a management module (135). The components of the system may be located on the same device (e.g., a server, mainframe, desktop Personal Computer (PC), laptop, Personal Digital Assistant (PDA), telephone, mobile phone, kiosk, cable box, or any other device) or may be located on separate devices connected by a network (e.g., the Internet), with wired and/or wireless segments. Those skilled in the art will appreciate that there may be more than one of each separate component running on a device, as well as any combination of these components within a given embodiment of the invention.

In one or more embodiments of the invention, the static analysis tool (105) is a software application. The static analysis tool (105) may be an application subroutine, a software module, a library, a job and/or any type of software component in accordance with one or more embodiments of the invention disclosed herein. For example, the static analysis tool (105) may be a bug checking software, executable from a command line interface. Alternatively, the static analysis tool (105) may be a hardware device, and/or a component of a hardware device. In one or more embodiments of the invention, the static analysis tool (105) includes functionality to identify program properties including program impact properties, unintended data flow properties, software bugs, security vulnerabilities, and/or compiler inefficiencies based on source code.

In one or more embodiments of the invention, the static analysis tool (105) includes functionality to obtain source code. Source code may be any software code written in one or more programming languages (e.g., C/C++, Java™, Python, Ruby, Personal Home Page (PHP) scripting language, Practical Extraction and Report Language (Pert), Linux® or UNIX® shell script, etc.) including compiled languages as well as interpreted languages of any order. Examples of source code may also include assembly code, byte code, and/or instructions outputted by a compiler or other entity. Source code may be a fully functional program and/or any executable subset of a program such as a function, class, library, statement, instruction, user-defined type, and/or any code segment. Source code may reference one or more outside classes, objects, files, libraries (e.g., a dynamically linked library) and/or application programming interfaces (APIs).

In one or more embodiments of the invention, the static analysis tool (105) is configured to receive the source code from a software development application. The static analysis tool (105) may be operatively connected to one or more software applications including, but not limited to, a concurrent versioning system, a web-based applications development platform, a distributed database of managed source code, and/or any software application or device capable of storing and/or transferring source code.

Continuing with FIG. 1, the static analysis tool (105) includes a user interface in accordance with one or more embodiments of the invention. In one or more embodiments of the invention, the static analysis tool (105) includes functionality to receive the source code from a user of the user interface. The user of the user interface may be an end user of a computer system, a software engineer, a designer, an applications developer, a system administrator, and/or any person or entity communicatively coupled with the static analysis tool (105). In one or more embodiments of the invention, the static analysis tool (105) is configured to import the source code periodically for batch processing of a managed code base.

In one or more embodiments of the invention, the static analysis tool (105) includes functionality to obtain one or more potential program property definitions. A potential program property definition may be used to identify one or more program properties within source code. The static analysis tool (105) may obtain the one or more potential program property definitions from a data repository (e.g., a hard disk drive and/or a relational database), a software application communicatively connected to the static analysis tool (105), a user of the static analysis tool (105), an author of the source code, and/or any authorized entity in accordance with one or more pre-defined security credentials. Alternatively or additionally, the static analysis tool (105) may be pre-configured and/or designed with the one or more potential program property definitions and/or security credentials.

In one or more embodiments of the invention, a program property may be any type of computer coding impact, data flow, error, vulnerability, inefficiency, or other property related to source code. For example, a program property may cause an unintended state of a computer program and/or a computer system executing the source code. Examples of a program property may include but are not limited to a specified data flow, data flow impact on a program object, an arithmetic defect (e.g., division by zero, arithmetic underflow or overflow, loss of arithmetic precision due to rounding, etc.), a syntax defect (e.g., use of the assignment operator instead of the equality operator, etc.), a multi-threading programming defect (e.g., deadlock, race condition, concurrency error in critical/atomic section, mutual exclusion, etc.), a security vulnerability (i.e., memory safety, user authentication vulnerabilities, etc.), and a compiler optimization inefficiency (i.e., inefficiencies in code analysis/interpretation/generation, etc.).

A potential program property may refer to an unverified program property (i.e., a program property which may or may not exist) related to source code. In one or more embodiments of the invention, an occurrence of the potential program property may be identified within the source code. If an occurrence of the potential program property is identified, the potential program property may then be referred to as a real program property. In one or more embodiments of the invention, if a potential program property is confirmed to be a real program property or not a program property, the potential program property is then deemed to be verified.

Continuing with FIG. 1, in one or more embodiments of the invention, the static analysis tool (105) includes functionality to execute a program property analysis on the source code. A program property analysis may be a procedure for verifying a potential program property (i.e., confirming whether the potential program property is a real program property or not a program property). In one or more embodiments of the invention, a program property analysis is associated with an estimated running time, complexity, and/or resource requirement(s).

In one or more embodiments of the invention, the static analysis tool (105) includes functionality to parse source code into a set of logical tokens and then analyze the tokens according to syntactical rules of the programming language in which the source code is written.

Continuing with FIG. 1, the model generator (107) includes functionality to identify a potential program property within the source code based on a potential program property definition in accordance with one or more embodiments of the invention. In one or more embodiments of the invention, the model generator (107) matches one or more program objects within the source code to a criteria defined by the potential program property definition. The criteria may include a regular expression, syntactical element of a programming language, a library name, a function name, a statement (e.g., assignment, arithmetic operation, function call, declaration, definition, etc.) and/or any sequence of text characters identifiable within the source code. In one or more embodiments of the invention, the one or more program objects have the potential to produce an occurrence of the potential program property.

A program object may be any element of source code including, but not limited to, a data structure, control structure, variable, object, memory allocation, thread, file, library, instruction, module, function, type, structure, value, attribute and/or any statement within the source code. For example, an instance of a Hashmap object may be a program object.

In one or more embodiments of the invention, the model generator (107) includes functionality to identify one or more function calls within the source code. The model generator (107) may use a set of syntactical rules of a programming language in which the source code is written to identify the function calls. In one or more embodiments of the invention, the model generator (107) is configured to parse the source code into one or more tokens based on one or more structural elements of the programming language. A token may be a smallest element of recognizable syntax in the programming language. In one or more embodiments of the invention, the one or more function calls may be identified based on a keyword match to one or more tokens.

In one example, the potential program property is a null pointer dereference defect. In this example, the model generator (107) identifies three character pointer variables within source code. The model generator (107) analyzes each of the three variables within the source code and determines that only two are de-referenced. For the two de-referenced pointer variables, all assignment statements are identified and it is determined that the de-referenced value is dependent upon a function return value. At this point in the analysis of the example, the model generator (107) does not perform context sensitive analysis (i.e., determining real potential values based on contextual data from one or more execution paths of the program). The model generator (107) identifies the two pointer variables and the function and proceeds to generate a value flow graph.

In another example, a programmer wishes to know whether a modification to source code has any potential impact on a set of program objects. In this example, the potential program property is a data flow impact on the program objects. The model generator (107) identifies the set of program objects and generates a value flow graph based on the modified source code. The value flow graph is then used to determine whether the modification to the source has any potential impact on the set of program objects.

Continuing with FIG. 1, the model generator (107) includes functionality to create a value flow graph representing at least a portion of the source code in accordance with one or more embodiments of the invention. A value flow graph is a model (i.e., an abstraction) representing the states, properties, and/or behavior (or a subset of the behavior) of the source code. The model generator (107) may identify the portion of the source code represented by the value flow graph based on one or more program objects identified by the static analysis tool (105). The model generator (107) may generate the value flow graph based on a potential program property and may model program behaviors, which may allow for the detection of an occurrence of the potential program property in the source code. In one or more embodiments of the invention, the model generator (107) is configured to exclude program behaviors (from the value flow graph) that do not have the potential to cause an occurrence of the potential program property and/or which have no bearing on reproducing the potential program property.

In one or more embodiments of the invention, the value flow graph includes one or more graph nodes and one or more directed graph edges (i.e., graph edges) connecting the one or more graph nodes. A graph node is a model object (i.e., an abstraction) representing one or more program objects, properties, states, and/or values of the source code. In one or more embodiments of the invention, a graph edge defines a potential flow of data from a source node to a destination node in the value flow graph.

In one or more embodiments of the invention, the model generator (107) includes functionality to create a graph node for one or more identified program objects associated with the potential program property. In one or more embodiments of the invention, according to the potential program property definition, the model generator (107) models a subset of the identified program objects as graph nodes. For example, for a potential null pointer dereference program property, the model generator (107) may identify a pointer variable and a Boolean variable as program objects. The Boolean variable is used as a flag to evaluate the control statement "if (temp is TRUE)" which determines whether or not to allocate memory for the pointer variable. In this example, the potential program property definition dictates that a graph node is only created for the pointer variable since the Boolean variable is deemed to affect the contextual analysis of the pointer variable values and not the construction of the value flow graph. The model generator (107) may use one or more program objects (in this example, the Boolean variable "temp") as context data items during contextual analysis (described below).

Continuing with FIG. 1, the model generator (107) includes functionality to identify one or more inputs of the function (i.e., function inputs) in accordance with one or more embodiments of the invention. Examples of a function may include any internal or external subroutine, method, job, procedure, library, statement, and/or portion of code capable of being executed from within the source code. A function input may be any program object which is used as an input of the function and/or modified by the function. Examples of function inputs may include, but are not limited to, arguments (i.e., parameter objects) and global variables (i.e., variables within the scope of both the caller and the function).

In one or more embodiments of the invention, the model generator (107) creates a function input node for each of the function's inputs. A function input node is a graph node representing a function input in the value flow graph. Thus, in one or more embodiments of the invention, each function may have any number of function input nodes.

In one or more embodiments of the invention, the model generator (107) includes functionality to identify one or more outputs of the function (i.e., function outputs). A function output may be any program object which is modified by the function. Examples of function outputs may include, but are not limited to, return objects (e.g., objects returned by return statements of the function), function arguments passed by reference, and global variables.

In one or more embodiments of the invention, the model generator (107) creates a function output node for each of the function's outputs. A function output node is a graph node representing a function output in the value flow graph. Thus, in one or more embodiments of the invention, each function may have any number of function output nodes.

In one or more embodiments of the invention, the model generator (107) includes functionality to identify a function's input(s) and/or output(s) based on its callee function. For example, if a function "F" calls a function "G", values passed from F to G are considered as F's output, and values passed from G to F are considered as F's input.

In one or more embodiments of the invention, the model generator (107) includes functionality to create one or more graph edges representing a value flow function. In one or more embodiments of the invention, a graph edge is a model object (i.e., an abstraction) representing a one-way dependency between two graph nodes defined by a value flow function. In this way, a graph edge may represent a flow of data among two functions represented by the two graph nodes.

In one or more embodiments of the invention, the model generator (107) includes functionality to identify one or more value flow functions, wherein each value flow function defines a conditional dependency between a pair of graph nodes. The conditional dependency may be a one-way dependency such that, if the condition is satisfied, one graph node is dependent upon the other. Thus, a value flow function may include a conditional statement representing the dependency. The conditional statement may be dependent on one or more identified program objects, properties, and/or values.

In one or more embodiments of the invention, the static analysis tool (105) includes functionality to evaluate the conditional statement and determine whether a flow of data and/or information (i.e., a dependency) exists between the connected graph nodes. Thus, in one or more embodiments of the invention, the conditional statement evaluates to a Boolean result (i.e., TRUE or FALSE). If the Boolean result is TRUE, the static analysis tool (105) may determine that the dependency exists. If the Boolean result is FALSE, the static analysis tool (105) may determine that the dependency does not exist. In one or more embodiments of the invention, the static analysis tool (105) is configured to assign a value of "UNDECIDABLE" for the value flow function when the conditional statement cannot be resolved statically.

Continuing with FIG. 1, the static analysis tool (105) includes functionality to traverse the value flow graph in order to identify a feasible path within the value flow graph depicting an occurrence of the potential program property within the source code in accordance with one or more embodiments of the invention. In traversing the value flow graph, the static analysis tool (105) may use any method of graph or tree traversal, in accordance with one or more embodiments of the invention. The static analysis tool (105) may traverse the value flow graph topologically in preorder. In a preorder traversal, the static analysis tool (105) may first traverse the entire left subtree, any intervening subtrees, and then the entire right subtree for each selected node in the value flow graph. The static analysis tool (105) may perform the traversal of the value flow graph recursively in one or more embodiments of the invention.

In one or more embodiments of the invention, the static analysis tool (105) includes functionality to identify one or more context data items required to evaluate a value flow function. A context data item may include a context-sensitive input to the value flow function identified within the source code. In one or more embodiments of the invention, the context data item may be among a set of program objects identified by the model generator (107) based on the potential program property definition. Given an example value flow function of "if (flag is TRUE)", the context data item may be a value of the "flag" variable (e.g., FALSE). A context data item may be any input to a value flow function and/or state, property, attribute, and/or value of a program object in an execution path of the source code depicted by a current path through the value flow graph.

In one or more embodiments of the invention, the static analysis tool (105) is configured to identify the context data item by examining the flow of information into a graph node. This value flow analysis may be based on one or more current execution paths depicted by feasible graph edges in a current traversal of a branch in the value flow graph. A branch in the value flow graph may refer to any top-down path through the value flow graph beginning at a start node of the value flow graph. In one or more embodiments of the invention, the static analysis tool (105) maintains one or more context data items in a current execution path of the program as it traverses the branch of the value flow graph. The context data items may include specific values, attributes, properties, and/or states of one or more program properties in the source code.

In one or more embodiments of the invention, the static analysis tool (105) includes functionality to determine whether a graph edge is feasible. A graph edge connecting a source graph node to a destination graph node may be deemed feasible if the value flow function evaluates to TRUE based on a context data item of the source graph node. Thus, a feasible graph edge indicates that a flow of data from the source node to the destination node is possible in the current path through the value flow graph. If the static analysis tool (105) deems a graph edge to be infeasible, traversal of the value flow graph does not take place through the destination node for the given context data item(s). Conversely, if the static analysis tool (105) deems a graph edge to be feasible, traversal of the value flow graph continues through the destination graph node and contextual analysis continues through one or more subtrees until an end node of the graph is reached or until no feasible paths to an end node remain.

In one or more embodiments of the invention, during traversal of the value flow graph, the static analysis tool (105) is configured to update context information and evaluate value flow functions to check whether a graph edge is feasible. In order to achieve context-sensitivity, the static analysis tool (105) may be configured to check whether the context of a context data item matches the graph edge based on a calling context identified in the source code. In one or more embodiments of the invention, the static analysis tool (105) is configured to perform context matching at the outgoing edges of the function output node(s). The static analysis tool (105) may deem the flow edge(s) feasible only if a matched context exists.

In one or more embodiments of the invention, the static analysis tool (105) includes functionality to identify a feasible path within the value flow graph between a start node of the value flow graph and an end node of the value flow graph. In one or more embodiments of the invention, a feasible path includes a path from the start node to the end node crossing only feasible graph edges.

Continuing with FIG. 1, the static analysis tool (105) includes functionality to determine that a feasible path depicts an occurrence of the potential program property within the source code in accordance with one or more embodiments of the invention. In one or more embodiments of the invention, the static analysis tool (105) matches one or more context data items to the end graph node in order to determine that the feasible path depicts an occurrence of the potential program property. The static analysis tool (105) may use any number of context data items identified along the feasible path to determine whether the path depicts an occurrence of the potential program property. In one or more embodiments of the invention, the potential program property definition includes context matching criteria identifying the occurrence of the potential program property. For example, given a potential null pointer dereference program property, a feasible path may be identified between a start graph node and an end graph node of a value flow graph. In this example, the start graph node represents a pointer value identified based on the source code and the end graph node represents a pointer variable in the source code. The potential program property definition includes a context matching criteria which states that any NULL value which has the potential to flow into the end graph node represents an occurrence of the potential program property. In this example, the context data item (i.e., the NULL value) flows into the end graph node through the feasible path. Accordingly, it is determined that an occurrence of the potential program property exists within the source code.

In one or more embodiments of the invention, the program property repository (110) is configured to store potential program property definitions, model data, and/or program metadata corresponding to the source code. The program property repository (110) may be implemented as a relational database, a hard disk drive, a networked array of storage devices, a software component (e.g., a data structure), a portion of a random access memory, and/or any physical or virtual storage device. Examples of model data may include, but are not limited to, one or more value flow graphs, graph nodes, graph edges, virtual memory models, program objects, context data items, and/or any data necessary for modeling and/or checking of source code. Examples of program metadata may include one or more Makefiles, configuration files, project files, and/or data relating to program property analyses and/or potential program property definitions. In one or more embodiments of the invention, the program property repository (110) is configured to store one or more potential program property definitions and/or program property analyses related to the potential program property definitions.

In one or more embodiments of the invention, the static analysis tool (105) includes functionality to communicate with an integrated development environment (not shown) and/or various other components of the system through the management module (135) (or directly).

In one or more embodiments of the invention, the static analysis tool (105) is configured to obtain source code from a user. For example, the user may be a software tester, an engineer, an applications developer, an author of the source code, and/or a user of an integrated development environment. In one or more embodiments of the invention, the static analysis tool (105) includes a graphical user interface configured to obtain input from the user. Thus, the user may define/modify/select one or more potential program property definitions, select one or more program property analyses, and/or initiate program property analysis through the graphical user interface.

In one or more embodiments of the invention, the source code repository (125) is configured to store source code. The source code repository (125) may be implemented as a software repository such as a relational database, a flat file, a folder, and/or any means of storing data on one or more hardware devices. The source code repository (125) may be an integrated part of a software application such as a CVS or an integrated development environment. Alternatively, the source code repository (125) may be implemented as a hard disk drive, a network storage device, and/or any type of memory device.

Continuing with FIG. 1, the memory (120) may be a Random Access Memory (RAM), a hardware cache, flash memory, and/or any other type of volatile or non-volatile storage medium. Further, the memory (120) may include functionality to store model data (i.e., graph nodes, graph edges, value flow functions, etc.) during evaluation and/or generation of the value flow graph. In one or more embodiments of the invention, if the size of the value flow graph grows beyond a pre-defined threshold defined by a user or other entity, the model generator (107) is configured to cancel the modeling process and produce an error message. The pre-defined threshold may be defined by a user within a graphical user interface of the static analysis tool (105). A virtual memory space (not shown) may be constructed by the model generator (107) within the memory (120) for the purpose of generating and/or verifying the value flow graph. In this way, virtual memory "values" corresponding to one or more model objects may be utilized by the static analysis tool (105).

In one or more embodiments of the invention, the management module (135) provides interoperability, format conversion and/or cross-compatibility among the various components of the system (199), as illustrated in an exemplary form in FIG. 1. For example, the management module (135) may transfer data between the static analysis tool (105) and the source code repository (125), and/or vice-versa. Furthermore, the management module (135) may be used as a seamless integration point between any combination of components both within the system (199) and outside of the system.

In one or more embodiments of the invention, various components of the system (199) are optional and/or may reside within other components or may be located on one or more physical devices.

Figure 2:
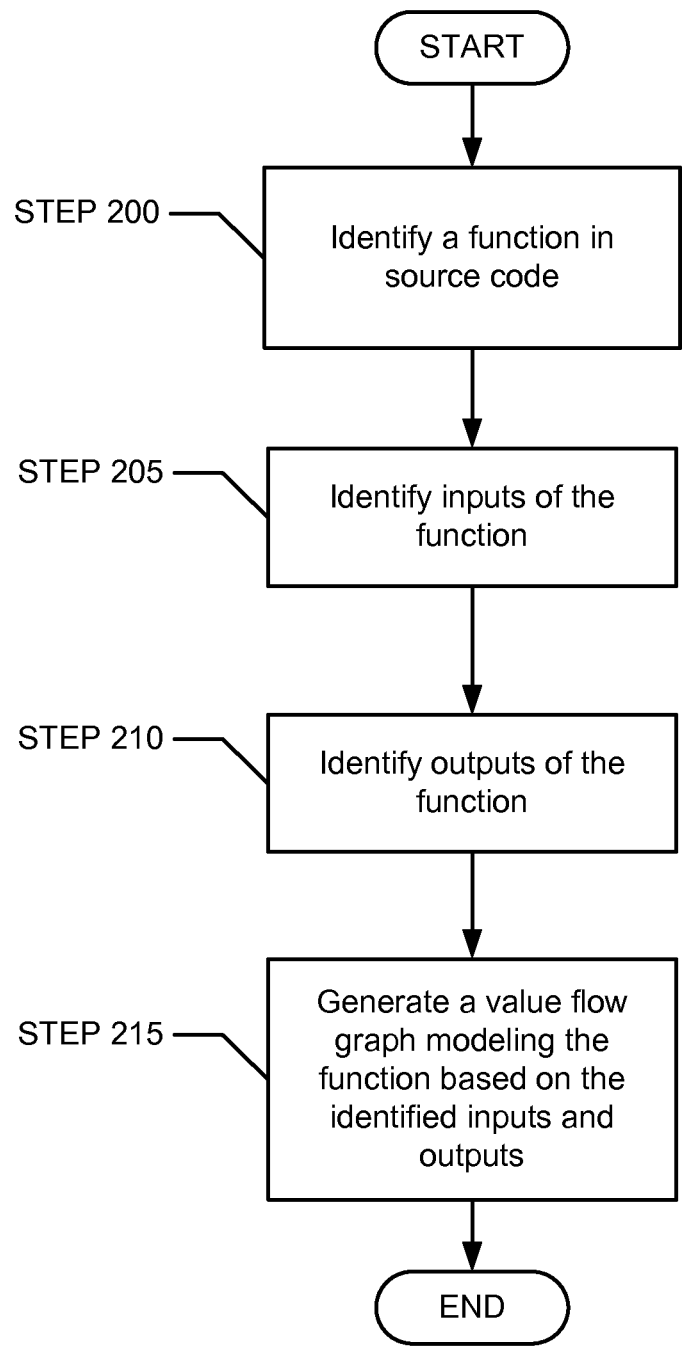
FIGS. 2-5 show flowcharts in accordance with one or more embodiments of the invention.

FIG. 2 shows a flowchart in accordance with one or more embodiments of the invention. The steps of the flowchart shown in FIG. 2 may be used to generate a value flow graph model of source code. Those skilled in the art, having the benefit of this detailed description, will appreciate the order and number of steps shown in FIG. 2 may differ among embodiments of the invention. Further, one or more steps in FIG. 2 may be optional and/or may be performed in any combination of different orders.

In STEP 200, a function is identified within source code. In one or more embodiments of the invention, the function is related to a potential program property and/or is required for analysis of the potential program property.

In STEP 205, one or more inputs of the function are identified within the source code. The function inputs may be arguments and/or global variables and may include any object, primitive, and/or parameter which is passed into the function.

In STEP 210, one or more outputs of the function are identified within the source code. The function outputs may be global variables and/or return objects and may include any object, primitive, and/or parameter which is returned from and/or modified by the function. The input(s) and/or output(s) of the function identified in STEPS 205 and 210 may depend upon a callee function associated with the function.

In STEP 215 a value flow graph model of the source code is created. The value flow graph may include a first graph node representing a function input identified in STEP 205 and a second graph node representing a function output identified in STEP 210.

Figure 3:
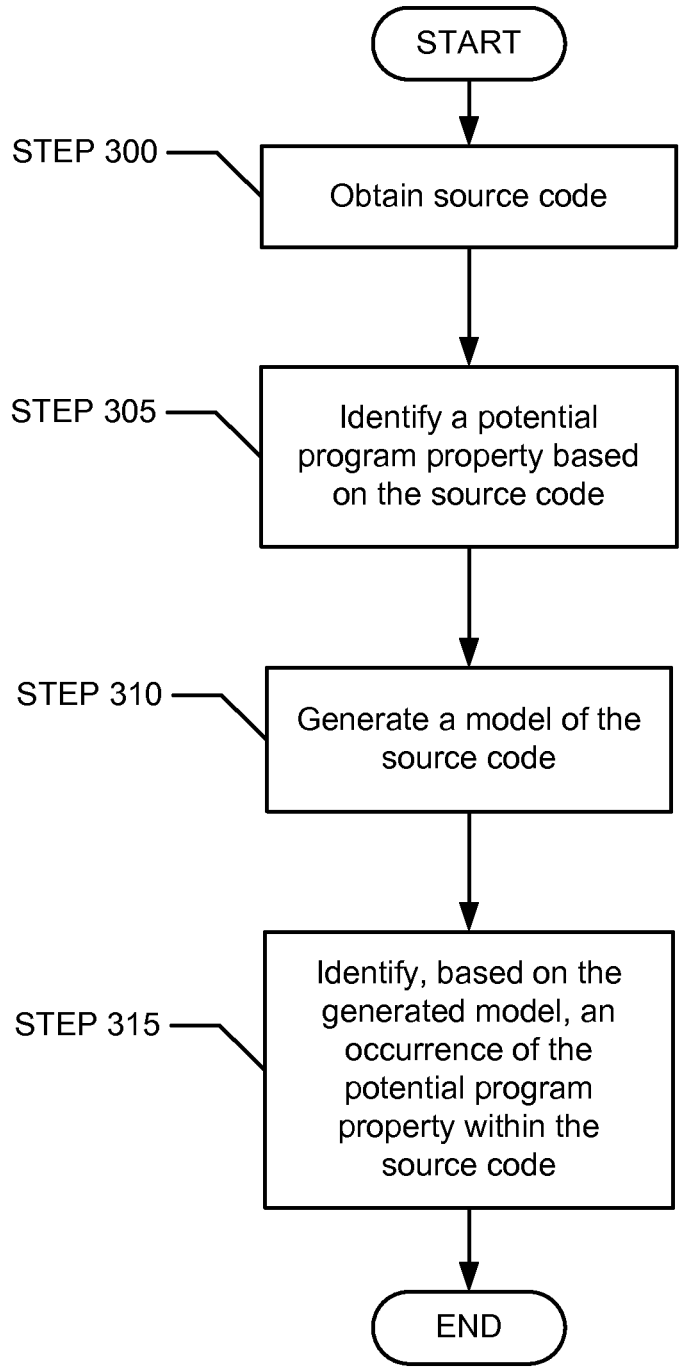

FIG. 3 shows a flowchart in accordance with one or more embodiments of the invention. The steps of the flowchart shown in FIG. 3 may be used to execute a program property analysis on source code. Those skilled in the art, having the benefit of this detailed description, will appreciate the order and number of steps shown in FIG. 3 may differ among embodiments of the invention. Further, one or more steps in FIG. 3 may be optional and/or may be performed in any combination of different orders.

In STEP 300, source code is obtained in accordance with one or more embodiments of the invention. The source code may be obtained from a user, a software program (e.g., an integrated development environment), and/or any other entity. In one or more embodiments of the invention, the source code may be obtained in accordance with a periodic program property analysis routine (e.g., a script performing one or more program property analysis tasks) that obtains a pre-defined list of computer programs and/or portions of one or more computer programs. In one or more embodiments of the invention, the source code is obtained from a concurrent versioning system (CVS) according to an instruction received from the program property analysis routine.

In STEP 305, a potential program property is identified based on source code in accordance with one or more embodiments of the invention. The potential program property may be identified based on a potential program property definition. The potential program property may be selected by a user (e.g., a developer using an IDE) and/or a pre-defined analysis schema. The analysis schema may include selection from an ordered list of potential program properties based on cost of analysis and/or sorting scheme.

Figure 4:
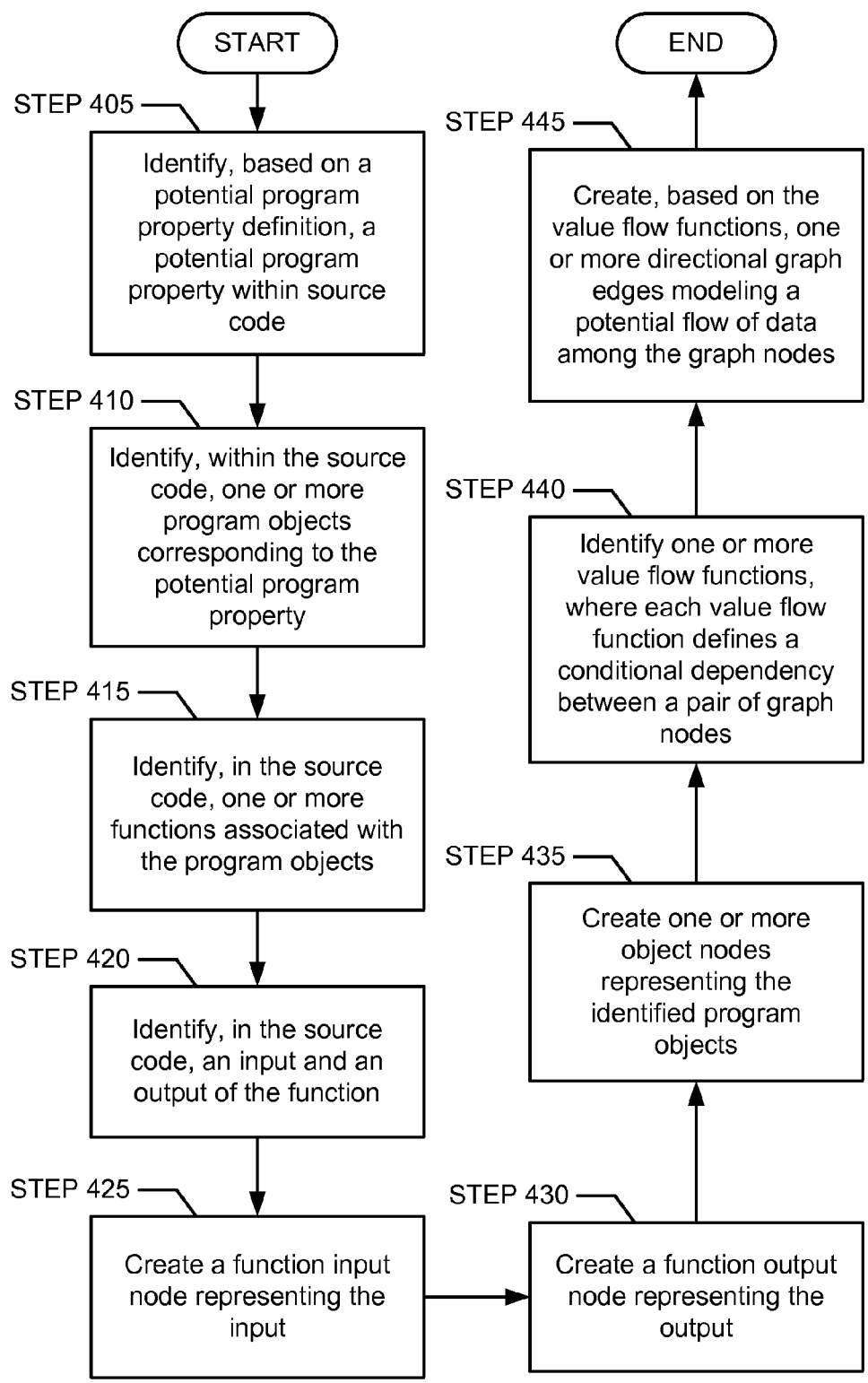

In STEP 310, a model of the source code is created in accordance with one or more embodiments of the invention. In one or more embodiments of the invention, the model is a value flow graph. The model of the source code may be constructed using value flow analysis and then used to perform context-sensitive analysis on the source code. In one or more embodiments of the invention, only source code capable of producing an occurrence of the potential program property is modeled. Source code which has no bearing on reproducibility of the potential program property may be excluded from the model. FIG. 4 as discussed below describes a method of generating a model of source code in accordance with one or more embodiments of the invention.

In STEP 315, an occurrence of the potential program property is identified within the source code based on the generated model in accordance with one or more embodiments of the invention. Thus, the model may represent the possible behaviors of the source code as related to the specified potential program property. In one or more embodiments of the invention, the model data represents only a subset of the potential states and/or behaviors of the source code (i.e., those related to the potential program property). Thus, any states in the model (e.g., a value flow graph) in which the potential program property is expressed are identified based on the values of the model data.

In one or more embodiments of the invention, a program property analysis may pass relevant information (e.g., analysis result, program property information, indeterminate analysis information, etc.) to one or more subsequent program property analyses. As a result of the program property analysis, the potential program properties may be determined to be a real program property and placed into a list of real program properties. A real program property corresponds to a program property which is verified to exist within the source code.

In addition to real program properties, a program property analysis may be indeterminate regarding one or more potential program properties, which will then remain as potential program properties. These potential program properties may be passed into other program property analyses and may subsequently be identified as real program properties or not program properties as a result of one or more subsequent program property analyses.

In one or more embodiments of the invention, multiple potential program properties within source code may be identified based on a single potential program property definition. As a result, multiple program property analyses may be executed. The program property analyses may be executed sequentially until the potential program properties are verified or until all program property analyses are complete. The program property analyses may be sorted based on complexity, run time, required resources, number of associated program objects, and/or based on the size of the relevant source code for the potential program property.

A program property analysis may lead to the production of a false positive or false negative identification. A false positive identification may be an erroneous determination that a program property exists. A false negative identification may be an erroneous determination that a program property does not exist. In one or more embodiments of the invention, a layered approach of program property analysis using a list of overlapping program property analyses serves to reduce the number of false positive and/or false negative identifications. For example, a first program property analysis may produce a false positive and/or negative identification which is then ruled out by a second program property analysis.

Execution of the program property analyses may include generating a separate value flow graph for each identified potential program property. This way, rather than modeling multiple potential program properties using a single model, many smaller models may be generated and analyzed. The program property analyses may be executed concurrently, in sequence, or in any combination thereof.

FIG. 4 shows a flowchart in accordance with one or more embodiments of the invention. The steps of the flowchart shown in FIG. 4 may be used to create a value flow graph model of source code. Those skilled in the art, having the benefit of this detailed description, will appreciate the order and number of steps shown in FIG. 4 may differ among embodiments of the invention. Further, one or more steps in FIG. 4 may be optional.

In STEP 405, a potential program property is identified within source code based on a potential program property definition in accordance with one or more embodiments of the invention. The potential program property may be identified by identifying one or more statement types and/or usages of statements defined by the potential program property definition. In one or more embodiments of the invention, the potential program property is determined to exist if any number of statements and/or syntactical elements of a programming language are matched to a set of source code statements defined by the potential program property definition. The potential program property definition may also define a specific sequence in which statements must exist in a flow path of the program and/or specific values assigned to one or more program objects as criteria in determining the existence of a potential program property.

In STEP 410, one or more program objects are identified within the source code based on the identified potential program property in accordance with one or more embodiments of the invention. The program objects may be directly matched to the criteria defined by the potential program property definition and/or may be identified as having the potential to cause an occurrence of the potential program property within the source code. Thus, in one or more embodiments of the invention, the program objects may alter a flow path, assignment, value, and/or state of the program that may affect the potential program property. In one or more embodiments of the invention, program objects and/or statements that are unrelated to reproducibility of the potential program property are excluded from the modeling process. A program object may include a value and/or start state of another program object.

In STEP 415, one or more functions associated with the program objects are identified in the source code in accordance with one or more embodiments of the invention. The function may affect reproducibility of the potential program property and/or may modify one or more of the identified program objects.

For example, a potential memory leak program property may be identified within a source code function based on a dynamic memory allocation. In this example, the potential program property definition dictates that the potential program property is determined to be present anywhere that a dynamic memory allocation is made. Thus, the system identifies the following four program objects as being associated with the potential program property: the memory allocation, two character pointer variables which are assigned to at least a portion of the allocated memory, and a NULL value initially assigned to the pointers. The character pointers are also used as arguments (i.e., inputs) for a second function in the source code. Accordingly, this second function is also selected for modeling.

In STEP 420, one or more inputs and one or more outputs are identified for each function in accordance with one or more embodiments of the invention. Function inputs and/or outputs may be identified based on a declaration, function header, function call, global declaration, return statement and/or other statement defining the function identified within the source code.

In STEP 425, a function input node is created for each identified function input, in accordance with one or more embodiments of the invention. The function input node may include one or more values depicting one or more attributes, properties, states, and/or values of the input.

In STEP 430, a function output node is created for each identified function output, in accordance with one or more embodiments of the invention. The function output node may include one or more values depicting one or more attributes, properties, states, and/or values of the identified output.

In STEP 435, one or more object nodes are created to represent the program objects identified in STEP 410 in accordance with one or more embodiments of the invention. An object node is a type of graph node in the value flow graph which represents a program object. An object node may include one or more values depicting one or more attributes, properties, states, and/or values of the program object. In one or more embodiments of the invention, each graph node (i.e., function input node, function output node, or object node) is uniquely identified by its corresponding value(s) and one or more graph edges connecting the graph node to one or more other graph nodes.

In STEP 440, one or more value flow functions are identified based on the source code in accordance with one or more embodiments of the invention. A value flow function may define a conditional dependency between a pair of graph nodes. In one or more embodiments of the invention, value flow functions are identified by following potential execution paths of the program and identifying one or more assignment statements depicting the flow of information in each potential execution path. Examples of an assignment statement may include simple assignment using an assignment operator (e.g., "="), passing one or more arguments in a statement invoking a subroutine, and/or any statement causing a transfer of information among one or more program objects. In one or more embodiments of the invention, the conditional dependency is directional (i.e., a one-way dependency) and may include one or more context-sensitive inputs (e.g., program object values). For a directional dependency, the value flow function may operate on one or more values of a source graph node in order to output one or more feasible (i.e., real) potential values of a destination graph node.

In STEP 440, the dependency may be identified, though not evaluated until after the construction of the value flow graph is complete (i.e., all nodes and edges are created), in accordance with one or more embodiments of the invention. Alternatively, the construction of the value flow graph may take place concurrently with context-sensitive analysis of the source code based on the value flow graph.

In STEP 445, one or more directed graph edges are created, based on the value flow functions, modeling a potential flow of data among the graph nodes in accordance with one or more embodiments of the invention. Each directed graph edge may correspond to a value flow function which defines the dependency between its source and destination nodes. In one or more embodiments of the invention, the directed graph edge is a model abstraction representing the relationship between its source and destination nodes.

The steps of generating a value flow graph as illustrated in an exemplary form in FIG. 4, may be performed in any order (based on any method of traversing the source code) in accordance with one or more embodiments of the invention.

Figure 5:
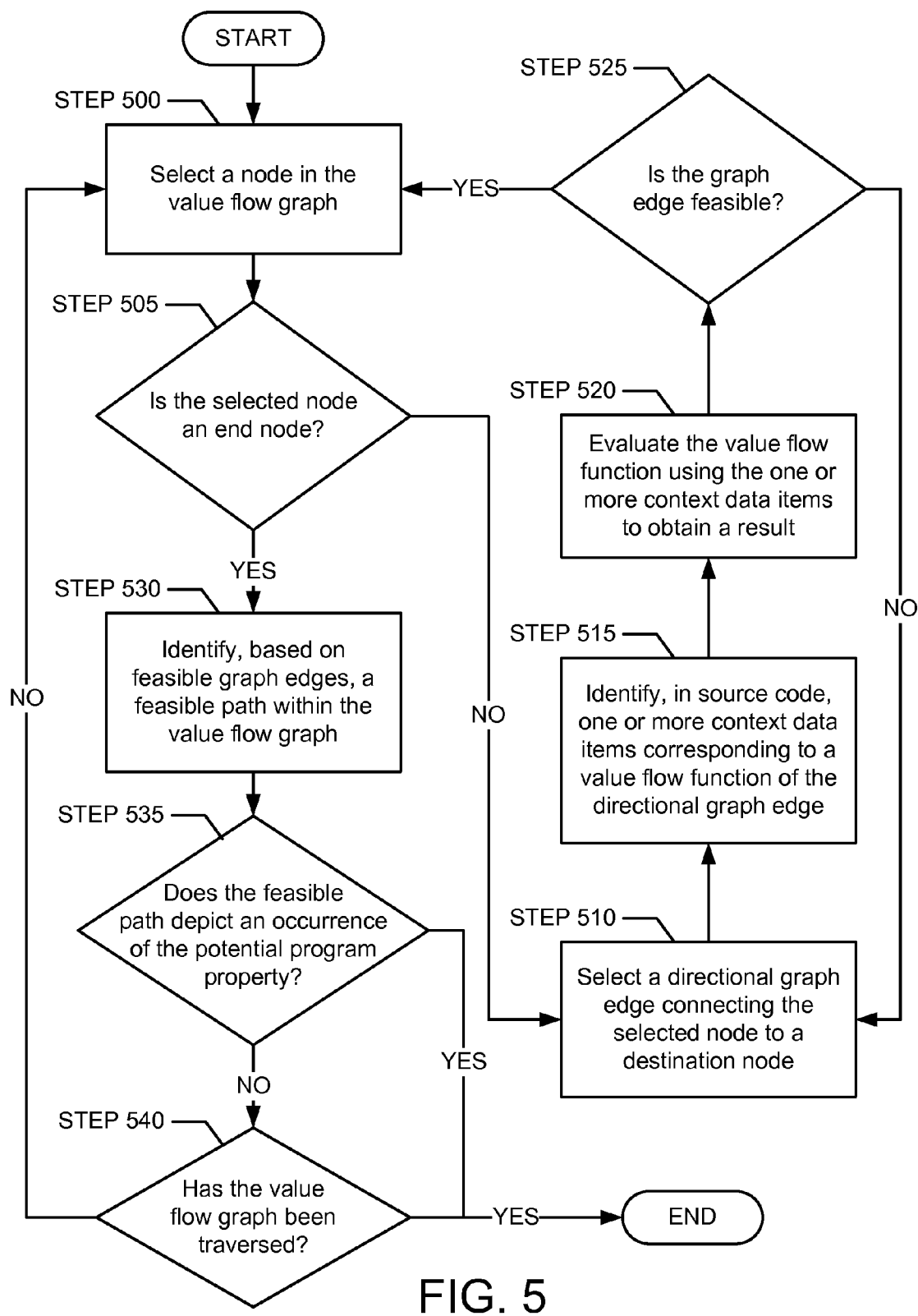

FIG. 5 shows a flowchart in accordance with one or more embodiments of the invention. The steps of the flowchart shown in FIG. 5 may be used to perform context-sensitive analysis of source code using a value flow graph and to identify, based on the context-sensitive analysis, a feasible path through the value flow graph depicting an occurrence of a potential program property within source code. Those skilled in the art, having the benefit of this detailed description, will appreciate the order and number of steps shown in FIG. 5 may differ among embodiments of the invention. Further, one or more steps in FIG. 5 may be optional.

In STEP 500, a node is selected within the value flow graph in accordance with one or more embodiments of the invention. In one or more embodiments of the invention, the node is selected topologically (i.e., in pre-order/depth-first) and/or in any order defined by the potential program property definition. The node may be selected based on matching a value of the node with a criteria defined by the potential program property definition. For example, if the value flow graph corresponds to a potential null pointer dereference program property, the potential program property definition may require that the first selected node have a value of NULL. In one or more embodiments of the invention, the first selected node is a start node (i.e., top level node) of the value flow graph.

In STEP 505, a determination is made whether the selected node is an end node in accordance with one or more embodiments of the invention. An end node (i.e., leaf node) is any node within a value flow graph which is not connected to any dependent nodes by a directed graph edge. In other words, data cannot flow from an end node to any other nodes in the value flow graph. If the selected node is an end node, the process proceeds to STEP 530. If the selected node is not an end node, the process proceeds to STEP 510.

In STEP 510, a directed graph edge connecting the selected node to a destination node is selected in accordance with one or more embodiments of the invention. The directed graph edge may be selected in any pre-defined order and/or in an order defined by the potential program property definition.

In STEP 515, one or more context data items corresponding to a value flow function of the selected directed graph edge are identified in accordance with one or more embodiments of the invention. The context data items may include one or more program objects (i.e., values, states, properties, and/or attributes, etc.) in the source code which are inputs required for evaluation of the value flow function. For example, if a value flow function includes the condition "if (ptr is NULL)", a value of the variable "ptr" may be extracted from the source code as a context data item.

In STEP 520, the value flow function is evaluated using the context data item(s) to obtain a result in accordance with one or more embodiments of the invention. In one or more embodiments of the invention, the result of the value flow function is a Boolean value (i.e., TRUE or FALSE). Evaluating the value flow function may require a variety of computing operations (e.g., arithmetic, logical, etc.) to be performed and/or may require one or more statement types of the programming language in which the source code is written to be evaluated.

In STEP 525, a determination is made, based on a result of the value flow function, whether the directed graph edge is feasible in accordance with one or more embodiments of the invention. In one or more embodiments of the invention, if the result of the value flow function is TRUE, it is determined that the directed graph edge is feasible and if the result is FALSE, it is determined that the directed graph edge is infeasible. In one or more embodiments of the invention, the value flow function may return a non-Boolean result, in which case the result is compared against a range of acceptable result values in order to determine feasibility of the directed graph edge. If it is determined that the directed graph edge is feasible, the process proceeds to STEP 500. In one or more embodiments of the invention, if it is determined that the directed graph edge is feasible, the next node selected by STEP 500 is the destination node of the directed graph edge. If it is determined that the directed graph edge is not feasible, the process proceeds to STEP 510.

In STEP 530, a feasible path is identified within the value flow graph based on feasible directed graph edges in accordance with one or more embodiments of the invention. In one or more embodiments of the invention, the feasible path does not include any infeasible or indeterminate (e.g., unvisited) directed graph edges. The feasible path may correspond to a program flow depicting a sequence of executing one or more statements within the source code.

In STEP 535, a determination is made whether the feasible path depicts an occurrence of the potential program property within the source code in accordance with one or more embodiments of the invention. If a determination is made that the feasible path does depict an occurrence of the potential program property, the process ends. If a determination is made that the feasible path does not depict an occurrence of the potential program property, the process proceeds to STEP 540.

In one or more embodiments of the invention, the occurrence of the potential program property may be identified based on a feasible value of an end graph node of the value flow graph. A feasible value may be any value resulting from an evaluation of a corresponding value flow function. In one or more embodiments of the invention, the potential program property definition includes one or more criteria used in identifying an occurrence of the potential program property within the source code based on the feasible path. The criteria may include any combination of states and/or values of one or more program objects depicted by the feasible path. Thus, in one or more embodiments of the invention, not every feasible path depicts an occurrence of the potential program property within the source code. Upon determining that the feasible path depicts an occurrence of the potential program property, the potential program property may be referred to as a real program property.

In STEP 540, a determination is made whether the value flow graph is traversed. In one or more embodiments of the invention, the value flow graph is deemed to be traversed when no unvisited paths remain and/or when all paths defined by the traversal method have been visited (or attempted to be visited). If it is determined that the value flow graph is traversed, the process ends. If a determination is made that the value flow graph is not yet traversed, the process proceeds to STEP 500.

The next node selected in STEP 500 (according to the predefined method of traversal) may be a start node or a non-start node which is connected to a node within the feasible path, in one or more embodiments of the invention. For example, in preorder traversal, the deepest unvisited node which is connected to a visited node may be selected. Thus, in one or more embodiments of the invention, the steps of FIG. 5 may be used to identify one or more feasible paths within the value flow graph until a feasible path depicting an occurrence of the potential program property is identified or until the value flow graph has been traversed.

Figure 6A:
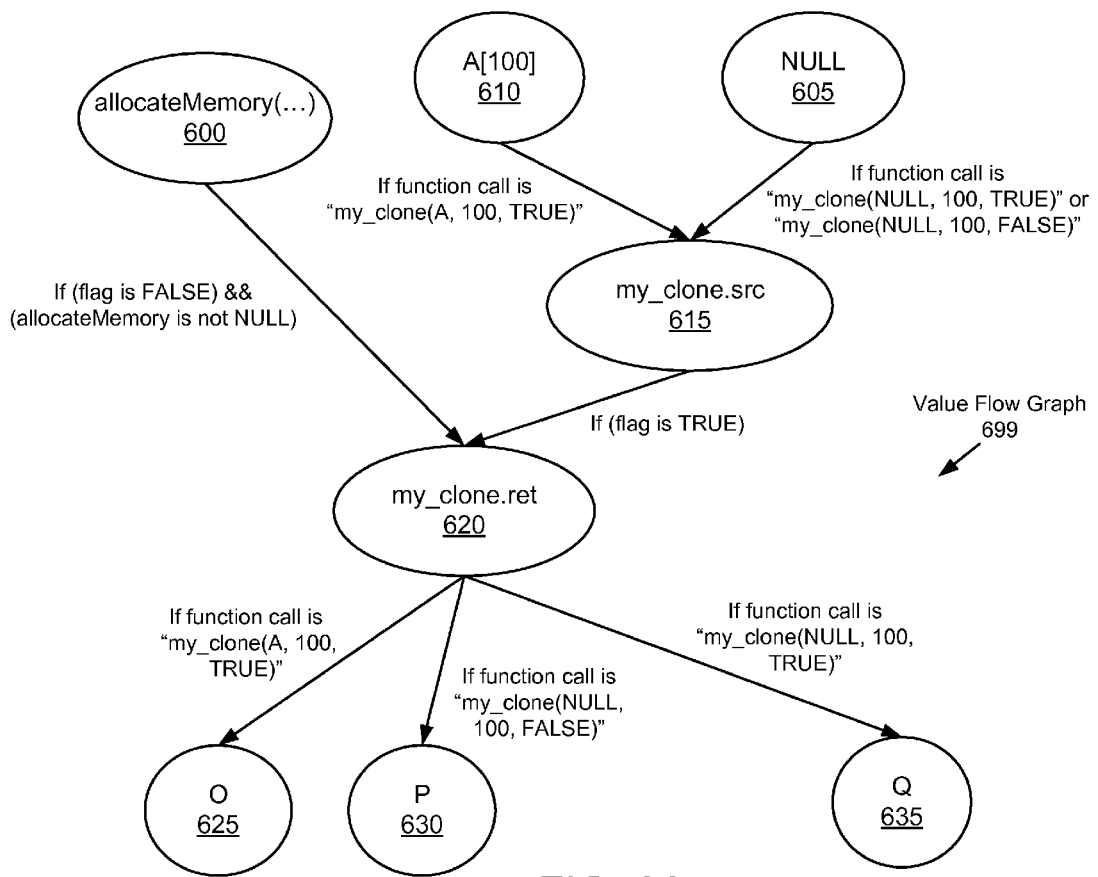
FIGS. 6A-6D show example value flow graphs in accordance with one embodiment of the invention.

FIG. 6A depicts an example value flow graph (699) constructed from the pseudocode representation of source code shown in TABLE 1.

TABLE 1

Example pseudocode

| | |
|---|---|
| 1 | Char * my_clone(Char * src, Integer size, Boolean flag) { <br> /* If flag is TRUE, return src <br> otherwise return an allocated buffer. */ |
| 2 | Char * tmp; |
| 3 | if (flag is TRUE) tmp = src; |
| 4 | else { |
| 5 | tmp = allocateMemory(size); |
| 6 | while (tmp == NULL) { |
| 7 | tmp = allocateMemory (size); |
| 8 | } |
| 9 | } |
| 10 | return tmp; |
| 11 | } |
| 12 | void main( ) { |
| 13 | Char *O, *P, *Q; |
| 14 | Char A [100]; |
| 15 | O = my_clone(A, 100, TRUE) ; |
| 16 | *O = 0; //pointer dereference |
| 17 | P = my_clone(NULL, 100, FALSE); |
| 18 | *P = 0; //pointer dereference |

TABLE 1-continued

Example pseudocode

```
19        Q = my_clone(NULL, 100, TRUE);
20        *Q = 0; //null pointer dereference
21    }
```

In this example, a static analysis tool (e.g., static analysis tool (105) of FIG. 1, discussed above) obtains a potential program property definition from a program property repository (e.g., program property repository (110) of FIG. 1, discussed above). The potential program property definition includes criteria for identifying null pointer de-reference defects. The criteria specifies that any pointer dereference operation should be identified as a potential null pointer dereference program property. Thus, if a dereference operation exists, it is determined that the potential null pointer dereference exists within the source code.

Continuing the example, the static analysis tool parses the source code into tokens. The static analysis tool identifies three pointer dereference operations at lines 16, 18, and 20 in the source code (above). After determining that the potential defect exists in the source code, a model generator (e.g., model generator (107) of FIG. 1, discussed above) proceeds to construct a value flow graph model of the source code. The model generator identifies a set of program objects corresponding to the potential defect in the source code. The program objects are as follows: pointer variables "O", "P", and "Q", the statement "allocateMemory(size)" (lines 5 and 7), the value "NULL", and the character array "A[100]". Graph nodes are created representing each of these program objects as shown in FIG. 6A (e.g., graph node (600), graph node (605), graph node (610), graph node (625), graph node (630), and graph node (635)).

Continuing the example, the model generator then determines that the function "my_clone" is related to the identified program objects and must be included in the value flow graph model due to the assignments on lines 15, 17, and 19. The "src" parameter is identified as a function input and modeled by the function input node "my_clone.src" (615 of FIG. 6A). The model generator also identifies the character pointer return type "ret" (line 1) as a function output. The model generator creates the function output node "my_clone.ret" (620 of FIG. 6A) to represent this function output.

Continuing the example, the model generator then proceeds to identify value flow functions depicting dependencies among each of the graph nodes. Conditional statements are extracted from the source code to depict each dependency between the graph nodes. Value flow functions are identified by following potential execution paths of the program and identifying one or more assignment statements depicting the flow of information in each potential execution path. The "allocateMemory( . . . )" graph node (600) flows into the "my_clone.ret" graph node (620) only if "flag is FALSE" and "allocateMemory is not NULL". This is determined based on the value of the variable "tmp" in line 10 of the example code (above). In order for the allocated memory to be returned by the function my_clone in this example, both conditions must be met (i.e., "flag is FALSE" and "allocateMemory is not NULL"). The model generator also creates directed graph edges representing the potential flow of information among the graph nodes. Each value flow function is displayed next to a corresponding directed graph edge in the example value flow graph (699) of FIG. 6A.

Continuing the example, the static analysis tool then performs context-sensitive analysis on the source code based on the constructed value flow graph (699) of FIG. 6A. First, the static analysis tool topologically selects graph node (600) and checks the directed graph edge connecting it to graph node (620) for feasibility. Following the function call on line 17 of the source code, the static analysis tool evaluates the value flow function and obtains a result of TRUE based on the argument "FALSE" being assigned to the variable "flag" and an assumption that the "allocateMemory" statement on line 5 will successfully allocate 100 bytes of memory. The static analysis tool determines that it is feasible for the allocated memory from graph node (600) to be returned by the function "my_clone".

The static analysis tool continues by topologically selecting the next graph node (620) and evaluating the value flow function between this graph node and the end graph node "O" (625). This value flow function, represented as "If function call is 'my_clone(A, 100, TRUE)'" in FIG. 6A, simply determines whether the original function call "my_clone(A, 100, TRUE)" is made in a valid execution path thus far in our traversal. The static analysis tool identifies the function call on line 17 (i.e., a context data item) of the source code as the entry point into the function "my_clone" in the current execution path. This function call is a context data item having a value of "my_clone(NULL, 100, FALSE)". Using the context data item, the value flow function evaluates to FALSE and the corresponding graph edge is determined to be infeasible.

Figure 6B:
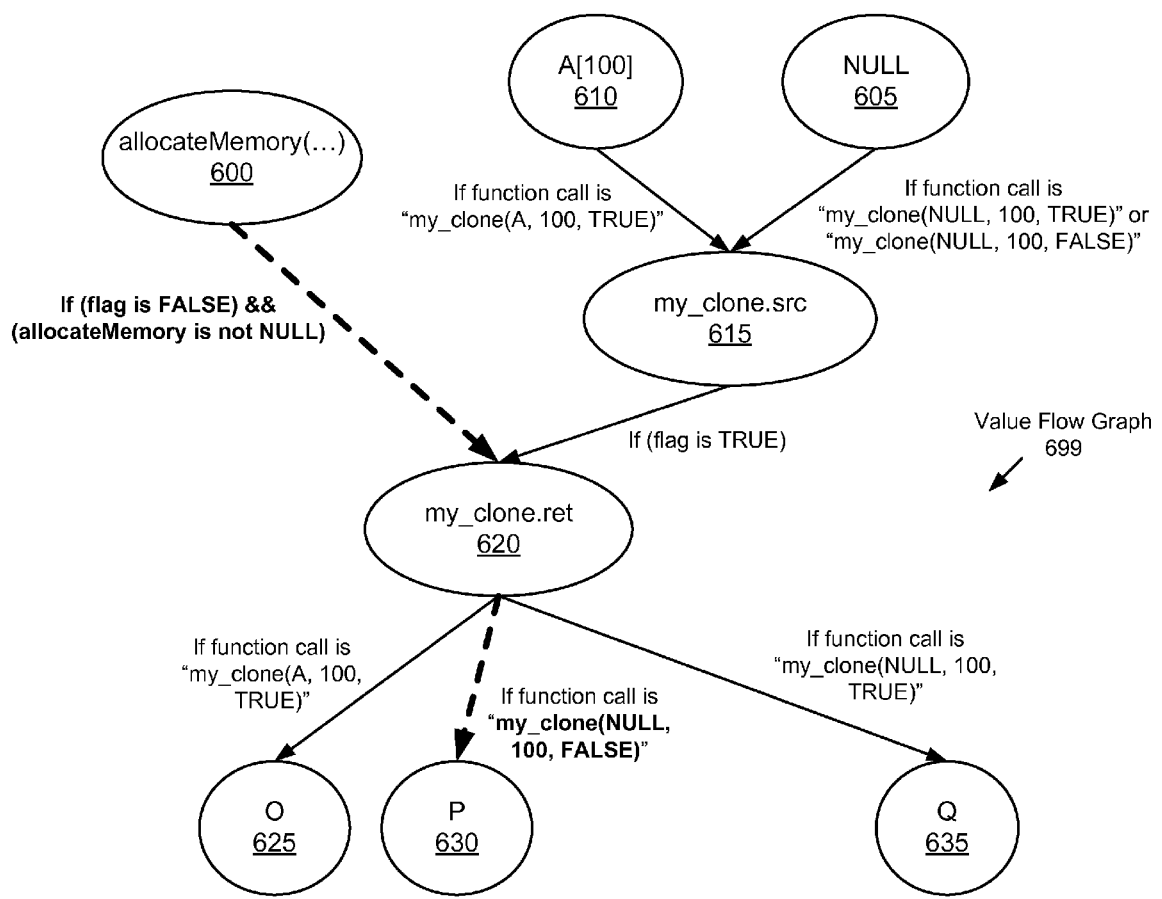

Continuing the example, the static analysis tool proceeds to check the next graph edge topologically. This edge connects graph node (620) with graph node (630) and has a corresponding value flow function which determines whether the function call "my_clone(NULL, 100, FALSE)" exists in a valid execution path for the current path through the value flow graph. The static analysis tool again identifies the function call on line 17 (i.e., a context data item) of the source code as the entry point into the function "my_clone" in the current execution path. This function call is a context data item having a value of "my_clone(NULL, 100, FALSE)". The value flow function evaluates to TRUE based on this context data item. Upon reaching end graph node (630), the static analysis tool determines that a feasible path has been identified. The feasible path is depicted by the dotted directed graph edges of the example value flow graph (699) in FIG. 6B.

Continuing the example, the static analysis tool now determines whether the identified feasible path indicates an occurrence of the potential program property in the source code (i.e., a null pointer dereference). In this case, the static analysis tool determines that in line 17 of the source code an assignment is made between a return object from the function "my_clone" (i.e., allocated memory) and the pointer variable P. Thus, the subsequent dereference operation (line 18) will not be a null pointer dereference since "P" is no longer a null pointer.

Figure 6C:
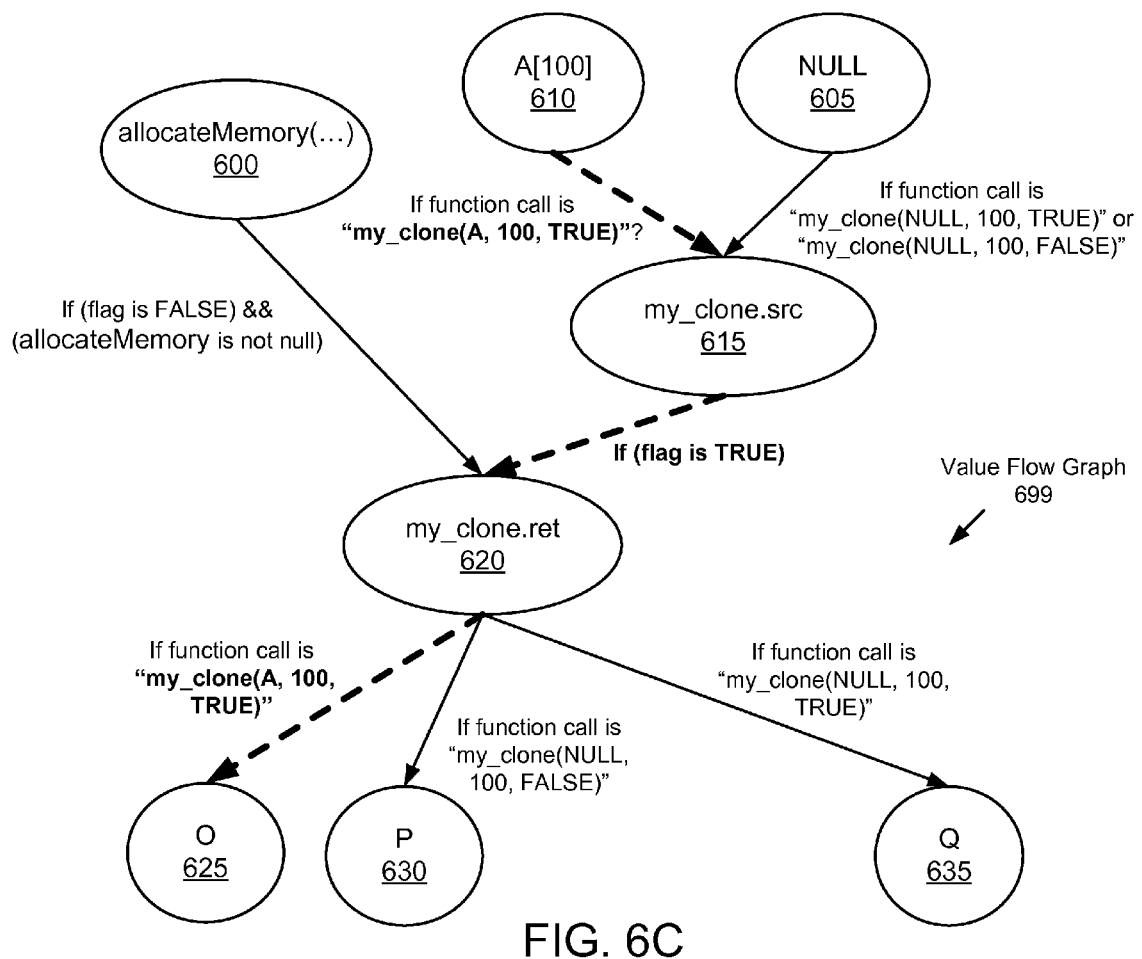

Continuing the example, the static analysis tool then proceeds to analyze the remainder of the value flow graph using context sensitivity. Using the same process described above, the static analysis tool identifies a second feasible path in the example value flow graph (699) shown in FIG. 6C. This feasible path leads to the pointer variable "O" having a non-null value as shown by the assignment statement on line 15 of the source code. Thus, the subsequent dereference operation will not be a null pointer dereference since "O" is no longer a null pointer.

Figure 6D:
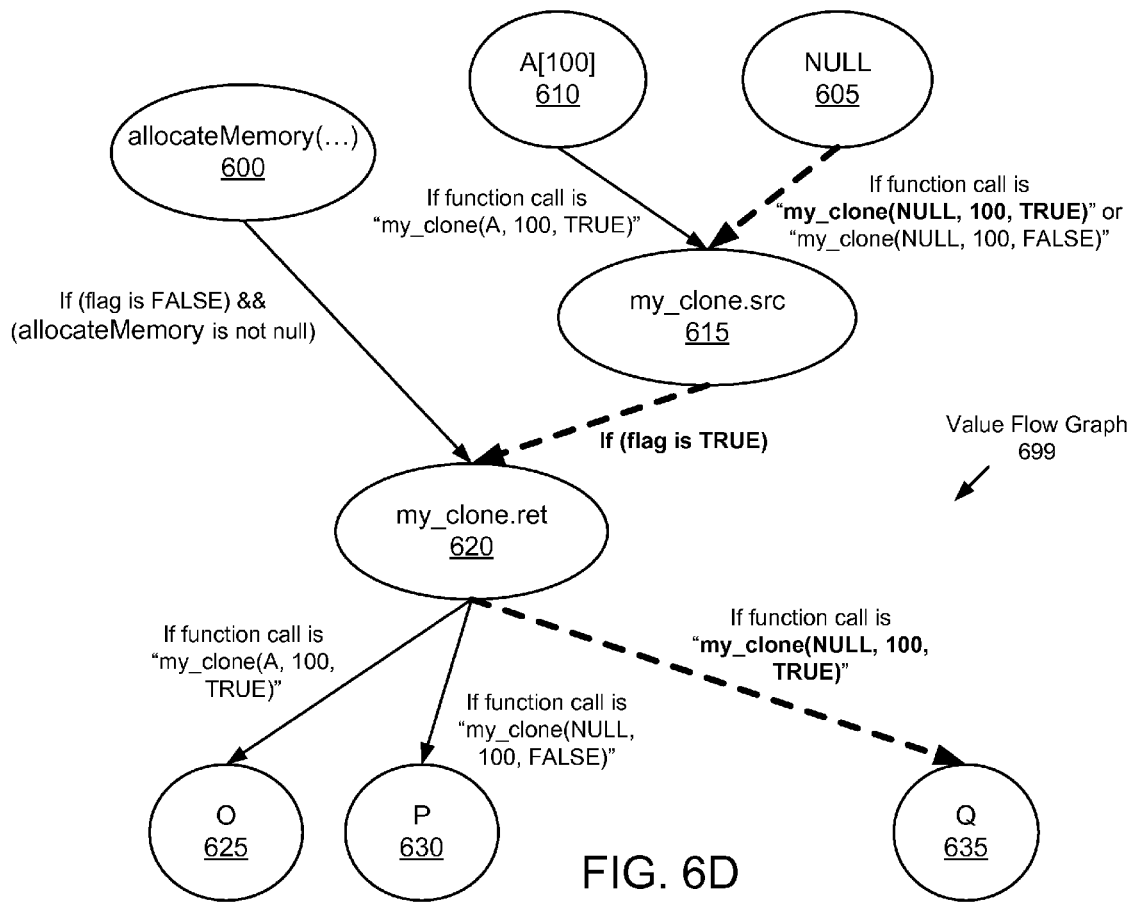

Continuing the example, the static analysis tool then proceeds to analyze the remainder of the value flow graph using context sensitivity. Using the same process described above, the static analysis tool identifies a third feasible path in the example value flow graph (699) shown in FIG. 6D. This feasible path leads to the pointer variable "Q" having a NULL value as shown by the assignment statement on line 19 of the source code. Thus, the subsequent dereference operation (line 20) will be a null pointer dereference. Accordingly, the static analysis tool determines that the feasible path depicted in the example value flow graph (699) of FIG. 6D depicts an occurrence of the potential program property within the source code. The static analysis tool designates the potential program property as a real program property and proceeds to output an error message to a user via a command line interface.

Figure 7:
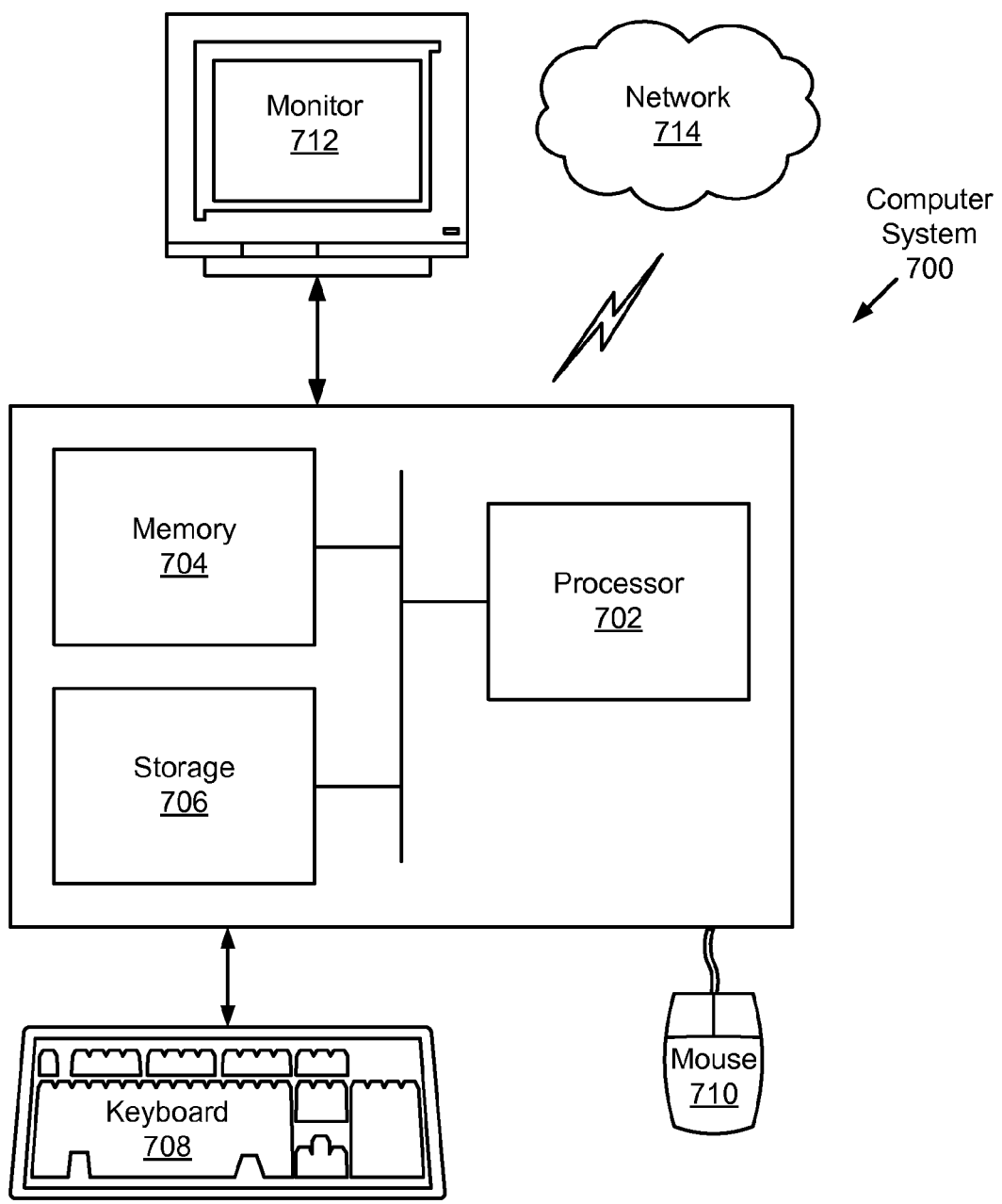
FIG. 7 shows a computer system in accordance with one or more embodiments of the invention.

Embodiments of the invention may be implemented on virtually any type of computer regardless of the platform being used. For example, as shown in FIG. 7, a computer system (700) includes one or more processor(s) (702) (such as a central processing unit (CPU), integrated circuit, hardware processor, etc.), associated memory (704) (e.g., random access memory (RAM), cache memory, flash memory, etc.), a storage device (706) (e.g., a hard disk, an optical drive such as a compact disk drive or digital video disk (DVD) drive, a flash memory stick, etc.), and numerous other elements and functionalities typical of today's computers (not shown). The computer system (700) may also include input means, such as a keyboard (708), a mouse (710), or a microphone (not shown). Further, the computer system (700) may include output means, such as a monitor (712) (e.g., a liquid crystal display (LCD), a plasma display, or cathode ray tube (CRT) monitor). The computer system (700) may be connected to a network (714) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (700) includes at least the minimal processing, input, and/or output means necessary to practice embodiments of the invention.

Further, in one or more embodiments of the invention, one or more elements of the aforementioned computer system (700) may be located at a remote location and connected to the other elements over a network. Further, embodiments of the invention may be implemented on a distributed system having a plurality of nodes, where each portion of the invention (e.g., static analysis tool (105), model generator (107), program property repository (110), source code repository (125), etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other tangible computer readable storage device.

One or more embodiments of the invention have one or more of the following advantages. By creating a function input node to model function inputs and a function output node to model function outputs of a single function, value flow functions in a value flow graph can be computed more efficiently. The increased efficiency in computing value flow functions may improve the precision and effectiveness of static analysis (e.g., bug checking), in one or more embodiments of the invention.

Further, by evaluating value flow functions in a value flow graph using one or more context-sensitive data items, different calling contexts at different call sites may be distinguished. The distinguishing of different calling contexts at different call sites may improve the precision and effectiveness of static analysis (e.g., bug checking), in one or more embodiments of the invention.

In addition, graph edges may represent dependencies between function input nodes and function output nodes. Although other dependencies may exist in the corresponding source code, they may all be summarized in the dependencies between function inputs and outputs. This abstraction may lead to greater efficiency in the analysis.

Finally, by generating a smaller model corresponding to a specific program property, large programs can be verified with a lower number of total model states and/or verification operations. The smaller model may lead to increased scalability and decreased analysis complexity, in one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for identifying program properties in a plurality of source code, comprising:
 identifying, using a processor, a plurality of program objects corresponding to a potential program property within the plurality of source code;
 identifying, using the processor, a function associated with the plurality of program objects in the plurality of source code;
 identifying an input and an output of the function in the plurality of source code;
 creating a value flow graph comprising a plurality of graph nodes by:
  creating a first plurality of object nodes corresponding to a plurality of input variables of the function;
  creating a function input node of the plurality of graph nodes representing the input of the function;
  creating a function output node of the plurality of graph nodes representing the output of the function;
  creating a second plurality of object nodes corresponding to a plurality of output variables of the function;
  identifying a plurality of value flow functions, wherein each value flow function of the plurality of value flow functions defines a conditional dependency between a pair of graph nodes of the plurality of graph nodes; and
  creating, based on the plurality of value flow functions, a plurality of directed graph edges of the value flow graph modeling a potential flow of data among the plurality of graph nodes;
 identifying a feasible subset of the plurality of directed graph edges, wherein identifying the feasible subset comprises:
  identifying, based on the potential program property, a start node of the value flow graph among the plurality of graph nodes;
  identifying, in the plurality of source code, a plurality of context data items corresponding to a subset of the plurality of value flow functions dependent on the start node; and evaluating, in a depth-first order of the value flow graph, the subset of the plurality of value flow functions using the plurality of context data items; and identifying, using the processor and based on the feasible subset of the plurality of directed graph edges, a feasible path in the value flow graph depicting an occurrence of the potential program property in the plurality of source code.

2. The method of claim 1, wherein identifying the feasible subset of the plurality of directed graph edges further comprises:

identifying, based on evaluating the subset of the plurality of value flow functions, the feasible subset of the plurality of directed graph edges.

3. The method of claim 2, wherein each value flow function of the subset of the plurality of value flow functions comprises a conditional statement, and wherein evaluating the subset of the plurality of value flow functions comprises evaluating the conditional statement.

4. The method of claim 2, wherein identifying the feasible path comprises:

identifying, based on the potential program property and the feasible subset of the plurality of directed graph edges, a plurality of end nodes of the value flow graph among the plurality of graph nodes; and traversing, by the feasible subset of the plurality of directed graph edges, the value flow graph in order to match a context data item of the plurality of context data items to an end node of the plurality of end nodes, wherein matching the context data item indicates the occurrence of the potential program property.

5. The method of claim 1, wherein the plurality of context data items comprises a plurality of values of the plurality of program objects.

6. The method of claim 1, wherein the potential program property is one selected from a group consisting of a memory leak, a null pointer dereference, an arithmetic defect, and a multi-threading defect.

7. A non-transitory computer-readable storage medium storing a plurality of instructions for identifying program properties in a plurality of source code, the plurality of instructions comprising functionality to:

identify a plurality of program objects corresponding to a potential program property within the plurality of source code;

identify a function associated with the plurality of program objects in the plurality of source code;

identify an input and an output of the function in the plurality of source code;

create a value flow graph comprising a plurality of graph nodes by:

creating a first plurality of object nodes corresponding to a plurality of input variables of the function;

creating a function input node of the plurality of graph nodes representing the input of the function;

creating a function output node of the plurality of graph nodes representing the output of the function;

creating a second plurality of object nodes corresponding to a plurality of output variables of the function;

identifying a plurality of value flow functions, wherein each value flow function of the plurality of value flow functions defines a conditional dependency between a pair of graph nodes of the plurality of graph nodes; and creating, based on the plurality of value flow functions, a plurality of directed graph edges of the value flow graph modeling a potential flow of data among the plurality of graph nodes;

identify a feasible subset of the plurality of directed graph edges, wherein identifying the feasible subset comprises:

identifying, based on the potential program property, a start node of the value flow graph among the plurality of graph nodes;

identifying, in the plurality of source code, a plurality of context data items corresponding to a subset of the plurality of value flow functions dependent on the start node; and evaluating, in a depth-first order of the value flow graph, the subset of the plurality of value flow functions using the plurality of context data items; and identify, based on the feasible subset of the plurality of directed graph edges, a feasible path in the value flow graph depicting an occurrence of the potential program property in the plurality of source code.

8. The non-transitory computer-readable storage medium of claim 7, wherein identifying the feasible subset of the plurality of directed graph edges further comprises:

identifying, based on evaluating the subset of the plurality of value flow functions, the feasible subset of the plurality of directed graph edges.

9. The non-transitory computer-readable storage medium of claim 8, wherein each value flow function of the subset of the plurality of value flow functions comprises a conditional statement and wherein evaluating the subset of the plurality of value flow functions involves evaluating the conditional statement.

10. The non-transitory computer-readable storage medium of claim 8, wherein identifying the feasible path comprises:

identifying, based on the potential program property and the feasible subset of the plurality of directed graph edges, a plurality of end nodes of the value flow graph among the plurality of graph nodes; and traversing, by the feasible subset of the plurality of directed graph edges, the value flow graph in order to match a context data item of the plurality of context data items to an end node of the plurality of end nodes, wherein matching the context data item indicates the occurrence of the potential program property.

11. The non-transitory computer-readable storage medium of claim 7, wherein the plurality of context data items comprises a plurality of values of the plurality of program objects.

12. The non-transitory computer-readable storage medium of claim 7, wherein identifying the potential program property in the plurality of source code comprises:

obtaining a potential program property definition comprising a criteria;

matching a subset of the plurality of program objects to the criteria; and determining, based on matching the subset of the plurality of program objects, that the potential program property exists within the plurality of source code.

13. A system for identifying program properties in a plurality of source code, comprising:

a processor;

a program property repository comprising functionality to store a potential program property definition; and a static analysis tool executing on the processor and comprising functionality to:
  identify, based on the potential program property definition, a plurality of program objects corresponding to a potential program property within the plurality of source code;
  identify, in the plurality of source code, a function associated with the plurality of program objects;
  identify an input and an output of the function in the plurality of source code;
  create a value flow graph comprising a plurality of graph nodes by:
    creating a first plurality of object nodes corresponding to a plurality of input variables of the function,
    creating a function input node of the plurality of graph nodes representing the input of the function,
    creating a function output node of the plurality of graph nodes representing the output of the function,
    creating a second plurality of object nodes corresponding to a plurality of output variables of the function,
    identifying a plurality of value flow functions, wherein each value flow function of the plurality of value flow functions defines a conditional dependency between a pair of graph nodes of the plurality of graph nodes, and
    creating, based on the plurality of value flow functions, a plurality of directed graph edges of the value flow graph modeling a potential flow of data among the plurality of graph nodes;
  identify a feasible subset of the plurality of directed graph edges, wherein identifying the feasible subset comprises:
    identifying, based on the potential program property, a start node of the value flow graph among the plurality of graph nodes;
    identifying, in the plurality of source code, a plurality of context data items corresponding to a subset of the plurality of value flow functions dependent on the start node; and
    evaluating, in a depth-first order of the value flow graph, the subset of the plurality of value flow functions using the plurality of context data items; and
  identify, based on the feasible subset of the plurality of directed graph edges, a feasible path in the value flow graph depicting an occurrence of the potential program property in the plurality of source code.

14. The system of claim 13, wherein identifying the feasible subset of the plurality of directed graph edges further comprises:
  identifying, based on evaluating the subset of the plurality of value flow functions, the feasible subset of the plurality of directed graph edges.

15. The system of claim 14, wherein identifying the feasible path comprises:
  identifying, based on the potential program property and the feasible subset of the plurality of directed graph edges, a plurality of end nodes of the value flow graph among the plurality of graph nodes; and
  traversing, by the feasible subset of the plurality of directed graph edges, the value flow graph in order to match a context data item of the plurality of context data items to an end node of the plurality of end nodes, wherein matching the context data item indicates the occurrence of the potential program property.

* * * * *

UNITED STATES PATENT AND TRADEMARK OFFICE
CERTIFICATE OF CORRECTION

| | | |
|---|---|---|
| PATENT NO. | : 8,516,443 B2 | Page 1 of 1 |
| APPLICATION NO. | : 13/117078 | |
| DATED | : August 20, 2013 | |
| INVENTOR(S) | : Li et al. | |

It is certified that error appears in the above-identified patent and that said Letters Patent is hereby corrected as shown below:

In the Specification

In column 3, line 53, delete "(Pert)," and insert -- (Perl), --, therefor.

Signed and Sealed this
Thirty-first Day of December, 2013

Margaret A. Focarino
*Commissioner for Patents of the United States Patent and Trademark Office*